Feb. 25, 1969     F. M. VODOKLYS ET AL     3,430,090
ANTIMONY ACTIVATED HALOPHOSPHATE PHOSPHOR
WITH RARE EARTH ADDITIVE
Filed June 24, 1965
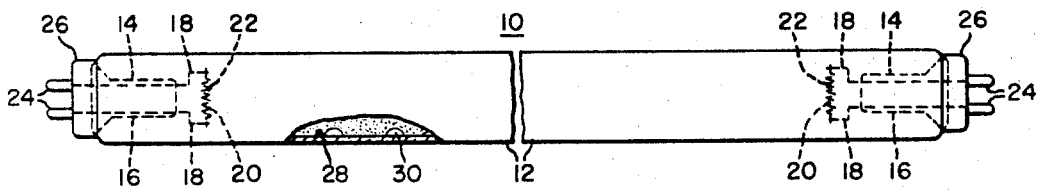
INVENTORS
Frank M. Vodoklys and
Richard C. Ropp
BY
W. D. Palmer
ATTORNEY United States Patent Office 3,430,090
Patented Feb. 25, 1969

3,430,090
ANTIMONY ACTIVATED HALOPHOSPHATE PHOSPHOR WITH RARE EARTH ADDITIVE
Frank M. Vodoklys, Wayne, and Richard C. Ropp, North Caldwell, N.J., assignors to Westinghouse Electric Corporation, Pittsburgh, Pa., a corporation of Pennsylvania
Filed June 24, 1965, Ser. No. 466,785
U.S. Cl. 313—109        15 Claims
Int. Cl. H01j 63/04; C09k 1/36

ABSTRACT OF THE DISCLOSURE

Halophosphate phosphor has added thereto a small amount of one or more of lutetium, terbium, gadolinium, thulium, yttrium, lanthanum, indium, scandium or gallium, preferably with a small amount of added cadmium. In the preferred method of addition, the cadium and other added additive metal is co-precipitated as oxalate, prior to incorporation into the phosphor by firing.

---

This invention relates to phosphor materials and, more particularly, to calcium or strontium halophosphate phosphor materials which have improved output, and to discharge devices which utilize such phosphor materials.

Halophosphate phosphor materials for fluoroscent lamps are well known and are described in U.S. Patent No. 2,488,733 to McKeag and Ranby. These halophosphate phosphor materials are generally analogous to the natural mineral apatite and display substantially the same X-ray diffraction pattern as this mineral. Briefly, halophosphate phosphor can be represented by the matrix $$3M_3(PO_4)_2 \cdot 1M'L_2$$

where L represents a halogen or mixture of halogens and M and M' represent either different or identical bivalent metals or mixtures of such metals. In practice, the primary metallic constituent for most halophosphate phosphor is calcium although strontium can be used to replace a part or all of the calcium. The halide constituent prior to firing normally comprises calcium or strontium chlorides or fluorides of mixtures of both and the matrix is normally activated by antimony or antimony plus manganese. The great majority of fluorescent lamps which are now manufactured in this country incorporate such a phosphor and the term "halophosphate" has become generic to the art for a phosphor of the foregoing general formulation and crystalline structure.

The fluorescent lamp art is highly competitive and a lamp which has an output of one or two lumens per watt greater than a competitive lamp will normally be sold over the competitive lamp. The art has placed much stress on output and efficiency and any improvement which will result in any appreciable increase in output and efficiency has a great effect in promoting one lamp over another competitive lamp.

It is the general object of this invention to provide an improved halophosphate phosphor, particularly for fluorescent lamps, which phosphor has improved performance characteristics.

It is another object to provide a fluorescent lamp which incorporates an improved halophosphate phosphor material, and which lamp has improved performance characteristics.

It is a further object to provide a method for processing halophosphate phosphor whereby an additive material is added to the phosphor in a particular fashion in order to improve the performance of the resulting phosphor and of the lamp incorporating such phosphor.

The foregoing objects of the invention, and other objects which will become apparent as the description proceeds, are achieved by providing particular additive material or materials for halophosphate phosphor having a matrix which at least principally comprises calcium or strontium halophosphate and which phosphor is activated by antimony or antimony plus manganese. In the preferred form of the phosphor, there is included a small amount of cadmium in addition to a small amount of at least one of the following series of elements, as metals or compounds: lutetium, terbium, gadolinium, thulium, yttrium, lanthanum, indium, scandium or gallium. If desired, the cadmium can be eliminated and the phosphor supplemented only by one or more of the latter-named additives. The resulting phosphor, when incorporated into a fluorescent lamp, will provide an improved output for the lamp.

For a better understanding of the invention, reference should be had to the accompanying drawing, wherein the sole figure illustrates an elevational view, partly in section, of a fluorescent lamp which incorporates the improved halophosphate phosphor material of this invention.

Although the principles of the invention are applicable to any type of fluorescent lamp and also to any type of device which utilizes a phosphor material, such as a fluorescent sign for example, the primary use for the phosphor is in conjunction with a 40 W. T12 type of fluorescent lamp and hence this type of lamp has been illustrated and will be considered in detail.

With specific reference to the form of the invention illustrated in the drawing, the numeral 10 illustrates generally a 40 W. T12 type fluorescent lamp comprising a tubular vitreous envelope 12 which is fabricated of soda-lime-silica glass, for example, having mounts 14 sealed into either end thereof, as is customary. Each mount comprises a vitreous portion 16 sealed to the ends of the envelope 12 with lead-in conductors 18 sealed therethrough and supporting refractory metal coils 20 at their inwardly extending extremities. The coils 20 are usually fabricated of tungsten and are normally of a coiled-coil construction or of a triple-coil construction, and such constructions are well known in the art. Contained within the turn or turns of the inner coil or coils is a filling of electron-emitting material 22, such as the conventional alkaline-earth oxides which may incorporate other materials such as zirconia.

Electrical connection for the lead-in conductors is normally made by contact pins 24 which project from supporting base caps 26 at either end of the lamp. The envelope 12 has coated on its inner surface a phosphor material 28, which in accordance with the present invention is a halophosphate phosphor material which incorporates the specific additive materials of this invention. The envelope also contains a small filling of argon or other inert ionizable gas, at a pressure of about 4 mm. for example, in order to facilitate starting, although other starting gases at various fill pressures can be used, as is well known. Also container within the envelope is a small charge of mercury 30 as is customary. In the operation of such a lamp, the phosphor is excited by the 2537 A.U. resonant radiation of the mercury discharge to produce visible light.

It is known to incorporate a small amount of cadmium into a halophosphate phosphor material in order to improve its performance and such an addition is disclosed in U.S. Patent No. 2,965,786 as well as in Canadian Patent No. 531,939. In accordance with the present invention, other selected additive materials are preferably used to supplement the cadmium addition. Alternatively, these other additive materials can be used alone without the cadmium addition. Following are specific examples for preparing phosphor material in accordance with the present invention.

EXAMPLE I

| Raw-mix constituents: | Moles |
|---|---|
| CaO (added as carbonate) | 4.314 |
| $P_2O_5$ (added as ammonium phosphate) | 1.5 |
| Mn (added as manganous carbonate) | 0.084 |
| $Sb_2O_3$ | 0.06 |
| Cd (added as cadmium carbonate) | 0.06 |
| $NH_4Cl$ | 0.30 |
| $CaF_2$ | 0.442 |
| $Tb_4O_7$ | 0.0004 |

In any of the Examples I–III, the CaO and $P_2O_5$ can be supplied by $CaHPO_4$ and $CaCO_3$, and can also be introduced as $CaCO_3$ and $(NH_4)_2HPO_4$.

The foregoing raw-mix constituents are thoroughly blended and then fired in a covered crucible or in an inert atmosphere, such as nitrogen, at a temperature of 1150° C. for a period of three hours. The resulting phosphor is a "cool white" halophosphate phosphor. If it is desired to eliminate the cadmium from the phosphor, there is added 0.06 mole of CaO to the raw mix to replace the cadmium.

While a terbium addition is considered in the foregoing example and in the following examples, any of the other indicated additives can be substituted for the terbium. For example, lutetium can be added to the raw mixes as $9 \times 10^{-4}$ mole of $Lu_2O_3$, gadolinium can be added as $1 \times 10^{-3}$ mole of $Gd_2O_3$, thulium can be added as $9 \times 10^{-4}$ mole of $Tm_2O_3$, yttrium can be added as $2 \times 10^{-4}$ mole of $Y_2O_3$, lanthanum can be added as $4 \times 10^{-4}$ mole of $La_2O_3$, indium can be added as $2 \times 10^{-4}$ mole of $In_2O_3$, scandium can be added as $3 \times 10^{-4}$ mole of $Sc_2O_3$, and gallium can be added as $4 \times 10^{-4}$ mole of $Ga_2O_3$. Also, any of the indicated additives materials can be mixed.

In any of the phosphors of the present invention, cadmium is used in amount of from 0 to 0.17 gram atom per two gram atoms of total phosphorus in the fired phosphor and the other indicated additives are used in total amount of $2 \times 10^{-5}$ to $8 \times 10^{-3}$ gram atom per two gram atoms of phosphorus in the phosphor. The beneficial effects of cadmium are noted with an amount as small as $8 \times 10^{-3}$ gram atom per two gram atoms of phosphorus in the phosphor. The optimum amount of additive metal will fall within the foregoing range, although it will vary somewhat with the type of phosphate used in the raw mix and the firing conditions. Preferably cadmium is used in the range of from 0.008 to 0.12 gram atom per two gram atoms of phosphorus in the phosphor and the other indicated additives are preferably used in amount of from $5 \times 10^{-5}$ to $4 \times 10^{-3}$ gram atom per two gram atoms of phosphorus in the fired phosphor.

EXAMPLE II

| Raw-mix constituents: | Moles |
|---|---|
| CaO (added as carbonate) | 4.275 |
| $P_2O_5$ (added as ammonium phosphate) | 1.5 |
| Mn (added as manganous carbonate) | 0.125 |
| $Sb_2O_3$ | 0.06 |
| Cd (added as cadmium carbonate) | 0.06 |
| $NH_4Cl$ | 0.30 |
| $CaF_2$ | 0.44 |
| $Tb_4O_7$ | 0.0004 |

The foregoing raw-mix constituents are thoroughly blended and then fired in a covered crucible or in an inert atmosphere, such as nitrogen, at a temperature of 1120° C. for a period of three hours. The resulting phosphor is a 3500° K. halophosphate phosphor. If it is desired to eliminate the cadmium from the phosphor, there is added 0.06 mole of CaO to the raw mix.

EXAMPLE III

| Raw-mix constituents: | Moles |
|---|---|
| CaO (added as carbonate) | 4.4 |
| $P_2O_5$ (added as ammonium phosphate) | 1.5 |
| $Sb_2O_3$ | 0.02 |
| Cd (added as cadmium carbonate) | 0.05 |
| $CaF_2$ | 0.45 |
| $Tb_4O_7$ | 0.0004 |

The foregoing raw-mix constituents are thoroughly blended and then fired in a covered crucible or in an inert atmosphere, such as nitrogen, at a temperature of 1180° C. for a period of three hours. The resulting phosphor is a blue halophosphate phosphor. If it is desired to eliminate the cadmium from the phosphor, there is added 0.05 mole of CaO to the raw mix.

EXAMPLE IV

| Raw-mix constituents: | Moles |
|---|---|
| SrO (added as carbonate) | 4.14 |
| $P_2O_5$ (added as ammonium phosphate) | 1.50 |
| Mn (added as manganous carbonate) | 0.08 |
| $Sb_2O_3$ | 0.02 |
| Cd (added as cadmium carbonate) | 0.06 |
| $SrCl_2$ | 0.13 |
| $SrF_2$ | 0.35 |
| $Tb_4O_7$ | 0.0004 |

The foregoing raw-mix constituents are thoroughly blended and then fired in a covered crucible or in an inert atmosphere, such as nitrogen, at a temperature of 1150° C. for a period of three hours. In either of Examples IV and V, the SrO and $P_2O_5$ can be introduced as $SrHPO_4$ and $SrCO_3$, and can also be added as $SrCO_3$ and $(NH_4)_2HPO_4$. The resulting phosphor is a strontium halophosphate phosphor. If it is desired to eliminate the cadmium from the phosphor, there is added 0.06 mole of SrO to the raw mix.

EXAMPLE V

| Raw-mix constituents: | Moles |
|---|---|
| SrO (added as carbonate) | 4.39 |
| $P_2O_5$ (added as ammonium phosphate) | 1.50 |
| $Sb_2O_3$ | 0.01 |
| Cd (added as cadmium carbonate) | 0.06 |
| $SrF_2$ | 0.48 |
| $Tb_4O_7$ | 0.0004 |

The foregoing raw-mix constituents are thoroughly blended and then fired in a covered crucible or in an inert atmosphere, such as nitrogen, at a temperature of 1125° C. for a period of three hours. The resulting phosphor is a blue-green strontium halophosphate phosphor. If it is desired to eliminate the cadmium from the phosphor, there is added 0.06 mole of SrO to the raw mix.

In any of Examples II through V, any of the other indicated additive materials or a mixture thereof can be used to supplement or replace the terbium additive material, as specified under Example I, maintaining the total gram-atoms of additive in the phosphor within the ranges as specified hereinbefore. In addition, strontium and calcium oxides can be mixed when preparing the phosphor to provide a calcium-strontium halophosphate matrix.

There are some fundamental principles which can be postulated from the improved performance of lamps which incorporate the present phosphor. As indicated before, it is known that cadmium, per se, as an additive will improve the performance of calcium halophosphate phosphor. Apparently the absorption of the phosphor for the 2537 A.U. excitation is increased by two to three percent by the inclusion of the cadmium. Some evidence has indicated that the cadmium should be maintained in the cadmous state in order to provide the best performance in the finished halophosphate phosphor. It is theorized that the foregoing additive metals do help maintain the cadmium in the cadmous state, so that its beneficial effect is enhanced.

It is preferred to incorporate the cadmium and specified additive metals into the phosphor either as mixed oxalates or as mixed oxides which are prepared from coprecipitated oxalates. In the case of the mixed oxalates, it has been noted that these materials are quite chemically reactive and cause a better mixing to occur during firing, in order to produce a more uniform phosphor. The better mixing can be obtained because of the small particle size of the reactants and consequent low bulk density. In addition, the presence of the oxalate radical also increases the bulk of the material and thus facilitates a better physical mixing. For example, if a small amount of material such as 500 parts per million is to be added to the raw mix, one pound of the additive material would have to be added to one ton of the raw mix material. With the mixed oxalates which have low bulk density, these problems are considerably lessened since a greater bulk for a given weight of the material is added to the phosphor raw mix.

It has also been found that incorporating the cadmium and other additive materials in the form of mixed oxalates provide a method whereby the reactants tend to stabilize the cadmium in the cadmous state, which apparently is the preferred state in which it is present in the phosphor.

As a specific example, there is coprecipitated from a solution, oxalates of cadmium and oxalates of one or more of lutetium, terbium, gadolinium, thulium, yttrium, lanthanum, indium, scandium and gallium. This is readily achieved by dissolving cadmium in the form of nitrate or any other soluble form of cadmium in a solution with any of the other additive materials in the form of the nitrates, or other soluble forms, maintaining the ratio of gram atoms of cadmium in the solution to gram atoms of the other material in the range of from 6000:1 to 1:1 and preferably in the range of from 2400:1 to 2:1. Upon addition of oxalic acid to this solution, the indicated metal ions in the solution are coprecipitated as oxalates.

It is also possible to employ an organic oxalate such as diethyl oxalate to supply to the oxalate radical. Alternatively, the addition of ethyl alcohol to oxalic acid results in a precipitate which can be readily handled. As an example, 617 gms. of $Cd(NO_3)_2$ are dissolved in 3.75 liters of distilled water and 293.2 gms. $La_2O_3$ are dissolved in 405 ml. of conc. $HNO_3$. Thereafter the lanthanum oxide solution is diluted to 1800 ml. and the cadmium nitrate and lanthanum oxide solutions are combined. To a 1.9 molar aqueous solution of oxalic acid is added 200 ml. of ethanol per liter of oxalic acid solution. To precipitate, heat both solutions to 80° C. and slowly add the oxalic acid solution to the cadmium nitrate and lanthanum oxide solutions to precipitate the metals as oxalates. Alternatively, add 110 ml. diethyl oxalate for each liter of cadmium-lanthanum solution, with the solutions maintained at room temperature. The mixture is stirred and heated gradually at a rate of five to eight degrees C. per minute, approaching the temperature of 80° C. slowly. The solution is held at 80° C. for a period of 45 minutes to complete the precipitate and the coprecipitated oxalates removed by filtration.

The coprecipitated oxalates are then incorporated directly into the phosphor in such amount that the gram-atom ratio of cadmium to two gram atoms of total phosphorus in compound form in the mix is from 0.008 to 0.17 and the ratio of gram atoms of the other additive materials to two gram atoms of total phosphorus in compound form in the mix is from $2 \times 10^{-5}$ to $8 \times 10^{-3}$.

As an alternative mode of preparation, the coprecipitated oxalates can be fired at a predetermined temperature sufficient to convert each of the mixed oxalates to the oxide. As a specific example, the coprecipitated oxalates are fixed at a temperature of 800° C. which will convert these materials to the oxides, or to cadmates. The mixed oxides are then added to the phosphor raw-mix constituents within the constituent ranges as specified hereinbefore.

In the case of lathanum, on firing the coprecipitated oxalates, a lanthaum cadmate ($La_2CdO_4$) is obtained which has the distinctive X-ray pattern of this material. This cadmate can be introduced directly into the phosphor raw-mix with additional cadmium as oxide, for example. In the case of the other additive constituents which are processed by firing the oxalates, apparently a mixed additive oxide is obtained.

Following is a table, designated Table I, indicating the benefits which are obtained when utilizing the terbium addition. Some of the other additive materials will produce their best results at the lower end of the indicated range of additions.

Table I

| Tb addition (in gm.-atoms per 2 gm.-atoms P): | Lumen gain (40 w. T12 lamps) over control |
|---|---|
| $5 \times 10^{-5}$ | 10 |
| $5 \times 10^{-4}$ | 30 |
| $2 \times 10^{-3}$ | 100 |
| $3 \times 10^{-3}$ | 103 |
| $5 \times 10^{-3}$ | 96 |
| $7 \times 10^{-3}$ | 50 |
| $8 \times 10^{-3}$ | 10 |

As indicated hereinbefore, it is preferred for best output to use the combination of cadmium plus the other indicated additives. In production tests, an increase of sixty to ninety lumens is regularly obtained in 40 W. T12 lamps over similar control lamps using a cadmum addition only. Each of these other indicated additives can be used without the cadmium either singly or as a mixture, in order to produce an improved effect over a phosphor which does not incorporate any other additive or cadmium. For example, with a terbium or gadolinium additive without cadmium, a gain of over 100 lumens in 40 watt T12 control lamps (phosphor without cadmium) can be obtained by utilizing an addition of 3 to $4 \times 10^{-3}$ gram atom of terbium or gadolinium per two gram atoms of phosphorus in the phosphor. When the other additives are used singly or mixed, without the cadmium, a substantial gain can be obtained over the control lamps which do not use cadmium in the phosphor. It is preferred to use gadolinium, terbium, yttrium or lanthanum as the additive material and lutetium and thulium are also very good.

It will be recognized that the objects of the invention have been achieved by providing a halophosphate phosphor material, particularly for use in fluorescent lamps, which has improved luminosity, as well as an improved method for incorporating additive materials into halophosphate phosphors.

While best embodiments have been illustrated and described hereinbefore, it is to be particularly understood that the invention is not limited thereto or thereby.

We claim as our invention:

1. A fluorescent lamp comprising, a sealed elongated vitreous envelope enclosing electrodes operatively disposed proximate the ends thereof and connected to lead-in conductors sealed through the envelope, a discharge-sustaining filling comprising mercury and a low pressure of inert ionizable starting gas within said envelope, and a phosphor coating on the inner surface of said envelope, said phosphor having a matrix consisting essentially of at least one of the group consisting of strontium halophosphate and calcium halophosphate and activated by one of the group consisting of antimony and antimony plus manganese, and said phosphor also containing from 0 to 0.17 gram atom of cadmium per two gram atoms of phosphorus and from $2 \times 10^{-5}$ to $8 \times 10^{-3}$ gram atom per two gram atoms of phosphorus of at least one additive material of the group consisting of lutetium, terbium, gadolinium, thulium, yttrium, lanthanum, indium, scandium and gallium.

2. The lamp as specified in claim 1, wherein said phosphor is calcium halophosphate phosphor.

3. The lamp as specified in claim 1, wherein cadmium is present in said phosphor in amount of from 0.008 to 0.12 gram-atom per two gram-atoms of phosphorus, and wherein said additive material is present in said phosphor in amount of from $5 \times 10^{-5}$ to $4 \times 10^{-3}$ gram atom per two gram atoms of phosphorus.

4. The lamp as specified in claim 3, wherein said additive material is at least one of the group consisting of lutetium, terbium, gadolinium, thulium, yttrium and lanthanum.

5. A halophosphate phosphor having a matrix consisting essentially of at least one of the group consisting of strontium halophosphate and calcium halophosphate and activated by one of the group consisting of antimony and antimony plus manganese, said phosphor containing from 0 to 0.17 gram atom of cadmium per two gram atoms of phosphorus, and from $2 \times 10^{-5}$ to $8 \times 10^{-3}$ gram atom per two gram atoms of phosphorus of at least one additive material of the group consisting of lutetium, terbium, gadolinium, thulium, yttrium, lanthanum, indium, scandium and gallium.

6. The phosphor as specified in claim 5, wherein said phosphor is calcium halophosphate phosphor.

7. The phosphor as specified in claim 5, wherein cadmium is present in said phosphor in amount of from 0.008 to 0.12 gram-atom per two gram-atoms of phosphorus, and wherein said additive material is present in said phosphor in amount of from $5 \times 10^{-4}$ to $4 \times 10^{-3}$ gram atom per two gram atoms of phosphorus.

8. The phosphor as specified in claim 7, wherein said additive material is at least one of the group consisting of lutetium, terbium, gadolinium, thulium, yttrium and lanthanum.

9. The method of processing halophosphate phosphor in order to improve the performance of the fluorescent lamp which incorporates the processed phosphor, said phosphor having a matrix consisting essentially of at least one of the group consisting of strontium halophosphate and calcium halophosphate and activated by one of the group consisting of antimony and antimony plus manganese, which method comprises:
 (a) mixing with the raw-mix constituents necessary to prepare said phosphor, coprecipitated oxalate of cadmium and oxalate of at least one additive material of the group consisting of lutetium, terbium, gadolinium, thulium, yttrium, lanthanum, indium, scandium and gallium, with the ratio of gram atoms of cadmium as oxalate to two gram atoms of total phosphorus in compound form in said mix being from 0.008 to 0.12, and with the ratio of total gram atoms of said additive material as oxalate to two gram atoms of total phosphorus in compound form in said mix being from $2 \times 10^{-5}$ to $8 \times 10^{-3}$; and
 (b) firing the resulting raw-mix under predetermined preparation conditions as required to form said phosphor.

10. The method as specified in claim 9, wherein said phosphor is calcium halophosphate phosphor.

11. The method as specified in claim 9, wherein cadmium is present as oxalate in said mix in amount of from 0.008 to 0.12 gram-atom per two gram-atoms of phosphorus in compound form in said mix, and wherein said additive material is present as oxalate in said mix in amount of from $5 \times 10^{-5}$ to $4 \times 10^{-3}$ gram atom per two gram atoms of phosphorus in compound form in said mix.

12. The method of processing halophosphate phosphor having a matrix consisting essentially of at least one of the group consisting of strontium halophosphate and calcium halophosphate and activated by one of the group consisting of antimony and antimony plus manganese, in order to improve the performance of a fluorescent lamp which incorporates the processed phosphor, which method comprises:
 (a) coprecipitating from a solution, oxalate of cadmium and oxalate of at least one material of the group consisting of lutetium, terbium, gadolinium, thulium, yttrium, lanthanum, indium, scandium and gallium, with the ratio of gram atoms of cadmium in said precipitate to gram atoms of material of said group in said precipitate being from 6000:1 to 1:1;
 (b) firing the precipitated oxalates at a predetermined temperature sufficient to convert each mixed oxalate to the oxide;
 (c) mixing with the raw mix constituents necessary to prepare said phosphor, the fired coprecipitated material, with the ratio of gram atoms of cadmium to two gram atoms of total phosphorus in compound form in the mix being from $8 \times 10^{-3}$ to $12 \times 10^{-2}$; and
 (d) firing the resulting mix under predetermined preparation conditions as required to form said phosphor.

13. The method as specified in claim 12, wherein the ratio of gram atoms of cadmium in said precipitate to gram atoms of said additive material in said precipitate is from 2400:1 to 2:1.

14. The method as specified in claim 9, wherein said raw-mix constituents necessary to prepare said phosphor are the following ingredients mixed in the following proportions: 4.314 moles calcium carbonate, 3 moles $(NH_4)_2HPO_4$, 0.084 mole manganous carbonate, 0.06 mole $Sb_2O_3$, 0.30 mole $NH_4Cl$, and 0.442 mole $CaF_2$; and said predetermined conditions as required to form said phosphor are a nitrogen firing atmosphere with a firing temperature of 1150° C. for a period of three hours.

15. The method as specified in claim 13, wherein said raw-mix constituents necessary to prepare said phosphor are the following ingredients mixed in the following proportions: 4.314 moles calcium carbonate, 3 moles $(NH_4)_2HPO_4$, 0.084 mole manganous carbonate, 0.06 mole $Sb_2O_3$, 0.30 mole $NH_4Cl$, and 0.442 mole $CaF_2$; and said predetermined conditions as required to form said phosphor are a nitrogen firing atmosphere with a firing temperature of 1150° C. for a period of three hours.

References Cited

UNITED STATES PATENTS 2,965,786  12/1960  Aia et al.
3,025,423  3/1962  Rimbach.
3,294,701  12/1966  Vogel et al. _____ 252—301.4

HELEN M. McCARTHY, *Primary Examiner.*

ROBERT D. EDMONDS, *Assistant Examiner.*

U.S. Cl. X.R.

252—301.4, 301.6